(12) United States Patent
Zhang et al.

(10) Patent No.: US 12,326,637 B2
(45) Date of Patent: *Jun. 10, 2025

(54) ARRAY SUBSTRATE, METHOD FOR MANUFACTURING SAME, AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Zhengdong Zhang, Beijing (CN); Xiaofei Yang, Beijing (CN); Lei Su, Beijing (CN); Limiao Wang, Beijing (CN); Hongjun Wang, Beijing (CN); Jia Meng, Beijing (CN); Xiaoxu Hu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,534

(22) Filed: Mar. 28, 2024

(65) Prior Publication Data

US 2024/0241412 A1 Jul. 18, 2024

Related U.S. Application Data

(63) Continuation of application No. 17/772,531, filed as application No. PCT/CN2021/079786 on Mar. 9, 2021, now Pat. No. 11,988,927.

(30) Foreign Application Priority Data

Apr. 10, 2020 (CN) .......................... 202010281302.6

(51) Int. Cl.
 *G02F 1/1362* (2006.01)
 *G02F 1/1343* (2006.01)

(52) U.S. Cl.
 CPC .. *G02F 1/136213* (2013.01); *G02F 1/136209* (2013.01); *G02F 1/136286* (2013.01); *G02F 1/134309* (2013.01)

(58) Field of Classification Search
 CPC ............ G02F 1/1333; G02F 1/133345; G02F 1/1343; G02F 1/134309; G02F 1/1362;
 (Continued)

(56) References Cited

U.S. PATENT DOCUMENTS 11,988,927 B2 * 5/2024 Zhang ............... G02F 1/136213
2004/0036815 A1 2/2004 Kim et al.
(Continued)

FOREIGN PATENT DOCUMENTS

CN 102346342 A 2/2012
CN 202332850 U 7/2012
(Continued)

OTHER PUBLICATIONS

International search report of PCT application No. PCT/CN2021/079786 issued on Jun. 11, 2021.
(Continued)

*Primary Examiner* — Thoi V Duong
(74) *Attorney, Agent, or Firm* — Lippes Mathias LLP (57) ABSTRACT

Provided is an array substrate. The array substrate includes a plurality of sub-pixels; wherein a storage capacitor and an extended storage capacitor are disposed in each of the plurality of sub-pixels, the extended storage capacitor and the storage capacitor being connected in parallel; and the array substrate includes a gate electrode layer, a source and drain electrode layer, and a pixel electrode.

20 Claims, 7 Drawing Sheets

(58) Field of Classification Search
CPC ......... G02F 1/136209; G02F 1/136213; G02F 1/136286; G02F 1/1368
See application file for complete search history.

(56) References Cited

U.S. PATENT DOCUMENTS

| | | |
|---|---|---|
| 2004/0090406 A1 | 5/2004 | Lin et al. |
| 2005/0263769 A1 | 12/2005 | Chul |
| 2006/0139547 A1 | 6/2006 | Ahn et al. |
| 2010/0328563 A1 | 12/2010 | Chang et al. |
| 2011/0006975 A1 | 1/2011 | Nagashima et al. |
| 2012/0033169 A1 | 2/2012 | Lee |
| 2012/0081274 A1 | 4/2012 | Chang et al. |
| 2017/0153508 A1 | 6/2017 | Huang et al. |
| 2018/0366492 A1 | 12/2018 | Zhou |
| 2022/0373845 A1 | 11/2022 | Zhang et al. |

FOREIGN PATENT DOCUMENTS

| | | |
|---|---|---|
| CN | 104503164 A | 4/2015 |
| CN | 105093740 A | 11/2015 |
| CN | 111338142 A | 6/2020 |
| KR | 20060059481 A | 6/2006 |

OTHER PUBLICATIONS

China National Intellectual Property Administration, First office action of Chinese application No. 202010281302.6 issued on Dec. 10, 2021, which is foreign counterpart application of this US application.
Examination report of counterpart Indian application No. 202227042529 issued on Nov. 23, 2022.
Non-final office Action of U.S. Appl. No. 17/772,531 issued on Sep. 28, 2023.
Notice of allowance of U.S. Appl. No. 17/772,531 issued on Jan. 19, 2024.

* cited by examiner

ARRAY SUBSTRATE, METHOD FOR MANUFACTURING SAME, AND DISPLAY DEVICE

CROSS-REFERENCE TO RELATED APPLICATION

This application is a continuation of U.S. patent application Ser. No. 17/772,531 filed on Apr. 28, 2022, now U.S. Pat. No. 11,988,927, which is a 371 of PCT Application No. PCT/CN2021/079786, filed on Mar. 9, 2021, which claims priority to Chinese Patent Application No. 202010281302.6, filed on Apr. 10, 2020 and entitled "ARRAY SUBSTRATE, METHOD FOR MANUFACTURING SAME, AND DISPLAY DEVICE," the disclosure of all of which is herein incorporated by reference in their entirety.

TECHNICAL FIELD

The present disclosure relates to the field of display technologies, and in particular, relates to an array substrate, a method for manufacturing the same, and a display device.

BACKGROUND

In a display panel of a liquid crystal display (LCD), that is, a liquid crystal display panel, a storage capacitor is configured to charge a liquid crystal capacitor in a screen holding phase to ensure that a voltage of the liquid crystal capacitor lasts until the next screen update.

Coupling capacitances are present between signal lines close to each other in the liquid crystal display panel. These coupling capacitances may affect the display of the display panel in the case that a capacitance of the storage capacitor is not sufficiently large. Especially for the liquid crystal display panel with a dual-gate line structure (that is, one row of sub-pixels is connected to two gate lines), the structures of two columns of sub-pixels connected to the same data line are not completely symmetrical. Exemplarily, distances between the signal lines are not equal, which causes an unequal parasitic capacitance between the signal lines in the two columns of sub-pixels, such that luminance of the two columns of sub-pixels connected to the same data line may be uneven. Exemplarily, the LCD shows alternate columns of vertical stripes with regular changes in luminance.

SUMMARY

Embodiments of the present disclosure provide an array substrate, a method for manufacturing the same, and a display device, which can increase the capacitance of a storage capacitor and improve display uniformity. The technical solutions are as follows.

In one aspect, an array substrate is provided. The array substrate includes a plurality of sub-pixels; wherein a storage capacitor and an extended storage capacitor are disposed in each of the plurality of sub-pixels, the extended storage capacitor and the storage capacitor being connected in parallel; and the array substrate includes a gate electrode layer, a source and drain electrode layer, and a pixel electrode; wherein a first capacitor plate of the storage capacitor is disposed in a layer where the pixel electrode is disposed, and a second capacitor plate of the storage capacitor is disposed in at least one layer of the gate electrode layer and the source and drain electrode layer; and a first capacitor plate of the extended storage capacitor is disposed in the layer where the pixel electrode is disposed, and a second capacitor plate of the extended storage capacitor is disposed in at least one layer of the gate electrode layer or the source and drain electrode layer.

Optionally, the first capacitor plate of the storage capacitor is the pixel electrode, and the second capacitor plate of the storage capacitor is a first electrode in the source and drain electrode layer; and the first capacitor plate of the extended storage capacitor is the pixel electrode, and the second capacitor plate of the extended storage capacitor is disposed in the source and drain electrode layer, and is connected to the first electrode of the source and drain electrode layer.

Optionally, the plurality of sub-pixels are arranged in an array, and the source and drain electrode layer includes a plurality of data lines extending along a column direction; and wherein two sub-pixels in a same row of sub-pixels are disposed between two adjacent data lines, each of the two sub-pixels includes an opening region, and the second capacitor plates of the extended storage capacitors of the two sub-pixels are disposed between the two opening regions of the two sub-pixels.

Optionally, the second capacitor plate of the extended storage capacitor is strip-shaped, wherein both lengths of the two strip-shaped second capacitor plates disposed in the same row of sub-pixels between the two adjacent data lines extend along the column direction, first ends of the strip-shaped second capacitor plates are connected to the corresponding first electrodes, and orthographic projections of the two strip-shaped second capacitor plates along a row direction are not overlapped with each other, the row direction being perpendicular to the column direction.

Optionally, the first capacitor plate of the storage capacitor is the pixel electrode, and the second capacitor plate of the storage capacitor is a light-blocking pattern in the gate electrode layer; and the first capacitor plate of the extended storage capacitor is disposed in the same layer as the pixel electrode and is connected to the pixel electrode, and the second capacitor plate of the extended storage capacitor is the light-blocking pattern in the gate electrode layer.

Optionally, the plurality of sub-pixels are arranged in an array, and the source and drain electrode layer includes a plurality of data lines extending along a column direction; wherein each of both sides of each of the plurality of data lines is provided with one column of sub-pixels;

in the two columns of sub-pixels disposed on the both sides of the same data line, the gate electrode layer includes a first light-blocking pattern and a second light-blocking pattern which are respectively disposed in the two sub-pixels in the same row, a first pixel electrode and a second pixel electrode are respectively disposed in the two sub-pixels in the same row, wherein the first light-blocking pattern and the first pixel electrode are disposed in the same sub-pixel, and the second light-blocking pattern and the second pixel electrode are disposed in the same sub-pixel; and an orthographic projection of side edge, proximal to the data line, of the first light-blocking pattern on a base substrate covers an orthographic projection of side edge, proximal to the data line, of the first pixel electrode on the base substrate, and an orthographic projection of side edge, proximal to the data line, of the second light-blocking pattern covers an orthographic projection of side edge, proximal to the data line, of the second pixel electrode on the base substrate.

Optionally, the gate electrode layer includes a gate electrode metal sub-layer and a conductive thin film sub-layer, and the gate electrode layer includes a U-shaped light-blocking pattern;

the first capacitor plate of the storage capacitor is the pixel electrode, and the second capacitor plate of the storage capacitor is the light-blocking pattern; and the first capacitor plate of the extended storage capacitor is the pixel electrode, the second capacitor plate of the extended storage capacitor is disposed in the conductive thin film sub-layer, orthographic projections of the second capacitor plate of the extended storage capacitor and a U-shaped opening of the light-blocking pattern on a base substrate are at least partially overlapped with each other, and the second capacitor plate of the extended storage capacitor is electrically connected to the light-blocking pattern.

Optionally, the light-blocking pattern is formed by the gate electrode metal sub-layer and the conductive thin film sub-layer.

Optionally, a capacitance of the storage capacitor ranges from 0.12 pF to 0.15 pF, and a capacitance of the extended storage capacitor and the storage capacitor connected in parallel ranges from 0.18 pF to 0.22 pF.

In one aspect, a display device is provided. The display device includes the aforementioned array substrate.

In one aspect, a method for manufacturing an array substrate is provided. The array substrate includes a plurality of sub-pixels, and the method includes:

successively manufacturing a gate electrode layer, a source and drain electrode layer, and a pixel electrode, and forming a storage capacitor and an extended storage capacitor in the sub-pixel, the extended storage capacitor and the storage capacitor being connected in parallel;

wherein a first capacitor plate of the storage capacitor is disposed in a layer where the pixel electrode is disposed, and a second capacitor plate of the storage capacitor is disposed in at least one of the gate electrode layer and the source and drain electrode layer; a first capacitor plate of the extended storage capacitor is disposed in the layer where the pixel electrode is disposed, and a second capacitor plate of the extended storage capacitor is disposed in at least one of the gate electrode layer or the source and drain electrode layer.

Optionally, successively manufacturing the gate electrode layer, the source and drain electrode layer and the pixel electrode includes:

successively manufacturing a conductive thin film sub-layer, a gate electrode metal sub-layer, a gate electrode insulating layer, an active layer, the source-drain layer, a planarization layer, and the pixel electrode on a base substrate, wherein the gate electrode layer includes the gate electrode metal sub-layer and the conductive thin film sub-layer, and the gate electrode layer includes a U-shaped light-blocking pattern;

the first capacitor plate of the storage capacitor is the pixel electrode, and the second capacitor plate of the storage capacitor is the light-blocking pattern; and the first capacitor plate of the extended storage capacitor is the pixel electrode, the second capacitor plate of the extended storage capacitor is disposed in the conductive thin film sub-layer, orthographic projections of the second capacitor plate of the extended storage capacitor and a U-shaped opening of the light-blocking pattern on the base substrate are at least partially overlapped with each other, and the second capacitor plate of the extended storage capacitor is electrically connected to the light-blocking pattern.

Optionally, successively manufacturing the conductive thin film sub-layer and the gate electrode metal sub-layer on the base substrate includes:

successively depositing a conductive thin film and a gate electrode metal on the base substrate;

coating a layer of a photoresist on the gate electrode metal;

exposing the photoresist by a halftone mask process, wherein a region corresponding to the light-blocking pattern is an unexposed region, and the U-shaped opening of the light-blocking pattern is a half-exposed region;

successively removing the photoresist, the gate electrode metal, and the conductive thin film in a fully-exposed region;

successively removing the photoresist and the gate electrode metal in the half-exposed region; and acquiring the conductive thin film sub-layer and the gate electrode metal sub-layer by removing the photoresist in the unexposed region.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, the embodiments of the present disclosure are described in detail hereinafter in combination with the accompanying drawings.

Figure 1:
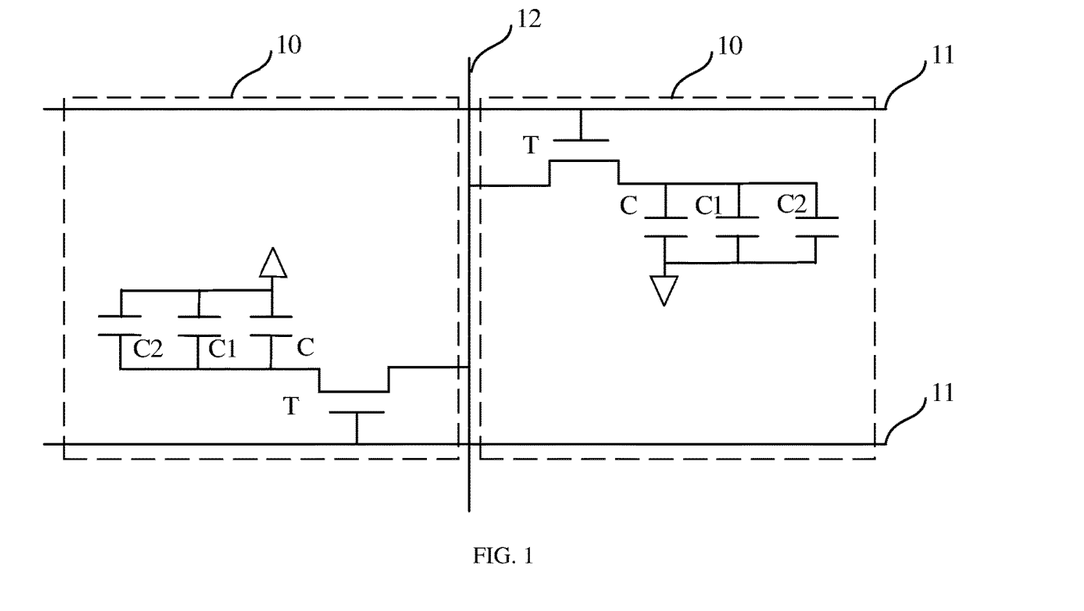
FIG. 1 is a schematic circuit diagram of an array substrate according to an embodiment of the present disclosure.

FIG. 1 is a schematic diagram of a circuit of an array substrate according to an embodiment of the present disclosure. The array substrate is a dual-gate line array substrate. As shown in FIG. 1, the array substrate includes a plurality of sub-pixels 10. In the dual-gate line array substrate, the plurality of sub-pixels 10 are divided into multiple pairs, and each pair of sub-pixels 10 includes two adjacent sub-pixels 10 (generally two adjacent sub-pixels 10 along a row direction). Two sub-pixels 10 of each pair of sub-pixels 10 are connected to a same data line 12, and are disposed on both sides of the data line 12; each pair of sub-pixels 10 corresponds to two gate lines 11, and each sub-pixel 10 is connected to one of the two gate lines. A storage capacitor C1 and an extended storage capacitor C2 are disposed in the sub-pixel 10, and the extended storage capacitor C2 and the storage capacitor C1 are connected in parallel.

As shown in FIG. 1, a thin film transistor T and a liquid crystal capacitor C are formed in the sub-pixel 10. In a screen holding stage, the storage capacitor C1 and the extended storage capacitor C2 may both charge the liquid crystal capacitor C to ensure that a voltage of the liquid crystal capacitor C continues until the next screen update.

In the related art, due to an insufficient design of the storage capacitor, and the action of a coupling capacitance between signal lines close to each other in the display panel, the sub-pixels on left and right sides of the same data line show a difference in luminance, which is macroscopically expressed as alternate columns of vertical stripes with regular changes in luminance. In this solution, the overall capacitance of the storage capacitor is increased by adding one extended storage capacitor connected to the storage capacitor in parallel, thereby improving the vertical stripes of the coupling capacitance between the signal lines in a display substrate in the case that the capacitance of the storage capacitor is not large enough, and improving display uniformity.

In the embodiments of the present disclosure, a capacitance of the storage capacitor C1 may range from 0.12 pF to 0.15 pF, and a capacitance of the extended storage capacitor C2 and the storage capacitor C1 connected in parallel may range from 0.18 pF to 0.22 pF. The capacitance is increased by connecting the extended storage capacitor C2 and the storage capacitor C1 in parallel, thereby ensuring the display uniformity.

Exemplarily, the capacitance of the storage capacitor C1 may be 0.14 pF, and the capacitance of the connected extended storage capacitor C2 and the storage capacitor C1 in parallel may be 0.18 pF.

The array substrate according to the embodiments of the present disclosure may be the display substrate of a twisted nematic (TN) liquid crystal display; the array substrate may further be the display substrate of a liquid crystal display such as an advanced super dimension switch (ADS) liquid crystal display and an in plane switching (IPS) liquid crystal display.

In the embodiments of the present disclosure, the number of the extended storage capacitors C2 in the sub-pixel 10 may range from 1 to 3.

To be specific, one or more extended storage capacitors C2 may be connected to the storage capacitor C1 in parallel in one sub-pixel 10, so as to increase the capacitance of the storage capacitor.

The technical solutions according to the embodiments of the present disclosure achieve the following beneficial effects.

In the solutions, the capacitance of the storage capacitor is increased by adding the extended storage capacitor connected to the storage capacitor in parallel, thereby preventing a coupling capacitance between signal lines in the display substrate from affecting the display of the display panel in the case that the capacitance of the storage capacitor is not large enough, improving the display uniformity, solving the problem of vertical stripes of the liquid crystal display, and improving a product screen quality of the liquid crystal display.

The structure of the extended storage capacitor C2 may be described in detail hereinafter in conjunction with the accompanying drawings. Before this, a film layer structure of the array substrate may be introduced to better illustrate the structure of the extended storage capacitor.

Figure 2:
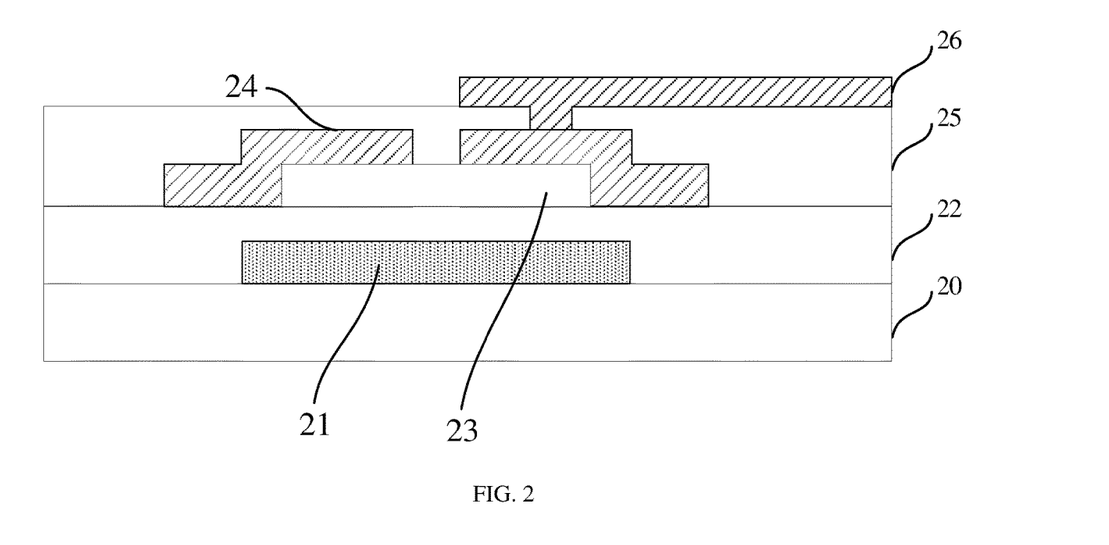
FIG. 2 is a hierarchical structural diagram of an array substrate according to an embodiment of the present disclosure.

FIG. 2 is a hierarchical structural diagram of an array substrate according to an embodiment of the present disclosure. Referring to FIG. 2, the array substrate includes: a base substrate 20, and a gate electrode layer 21, a gate electrode insulating layer 22, an active layer 23, a source and drain electrode layer 24, a planarization layer 25 (or a protective layer PVX), and a pixel electrode 26 that are successively laminated on the base substrate 20. The source and drain electrode layer 24 includes a data line, a source electrode, and a drain electrode. The drain electrode is connected to the data line, and the source electrode is connected to the pixel electrode 26 through a via hole. The connection herein may be electrical connection.

The base substrate 20 may be a glass substrate. Each of the gate electrode layer 21 and the source and drain electrode layer 24 may be a metal layer or an indium tin oxide layer. The gate electrode insulating layer 22 may be an insulating layer made of one of silicon oxide, silicon nitride, and silicon oxynitride, or a laminated layer made of at least two layers therein. The active layer 23 may be a polysilicon layer or an amorphous silicon layer. The planarization layer 25 may be a resin layer, and the planarization layer may further be a planarization layer made of one of silicon oxide, silicon nitride, and silicon oxynitride, or a laminated layer made of at least two layers therein. The pixel electrode 26 may be an indium tin oxide electrode.

FIG. 2 shows merely one example of a structure of a thin film transistor of the array substrate. In other examples, the array substrate may further be other structures, as long as functions of the array substrate can be achieved. Exemplarily, FIG. 2 shows a bottom gate structure. In other examples, the array substrate may further be a top gate structure.

In some embodiments of the present disclosure, a first capacitor plate of the storage capacitor C1 is disposed in a layer where the aforementioned pixel electrode 26 is disposed, and a second capacitor plate of the storage capacitor C1 may be disposed in at least one layer of the gate electrode layer 21 or the source and drain electrode layer 24. A first capacitor plate of the extended storage capacitor C2 is disposed in the layer where the pixel electrode 26 is disposed, and a second capacitor plate of the extended storage capacitor C2 may be disposed in at least one of the gate electrode layer 21 or the source and drain electrode layer 24.

Exemplarily, the pixel electrode 26 and a light-blocking pattern in the gate electrode layer 21 may form the aforementioned storage capacitor C1. Optionally, the pixel electrode 26 and one electrode of the source and drain electrode layer 24 may form the aforementioned storage capacitor C1. Optionally, the pixel electrode 26 may simultaneously form the aforementioned storage capacitor C1 with the light-blocking pattern in the gate electrode layer 21 and one electrode of the source and drain electrode layer 24.

Figure 3:
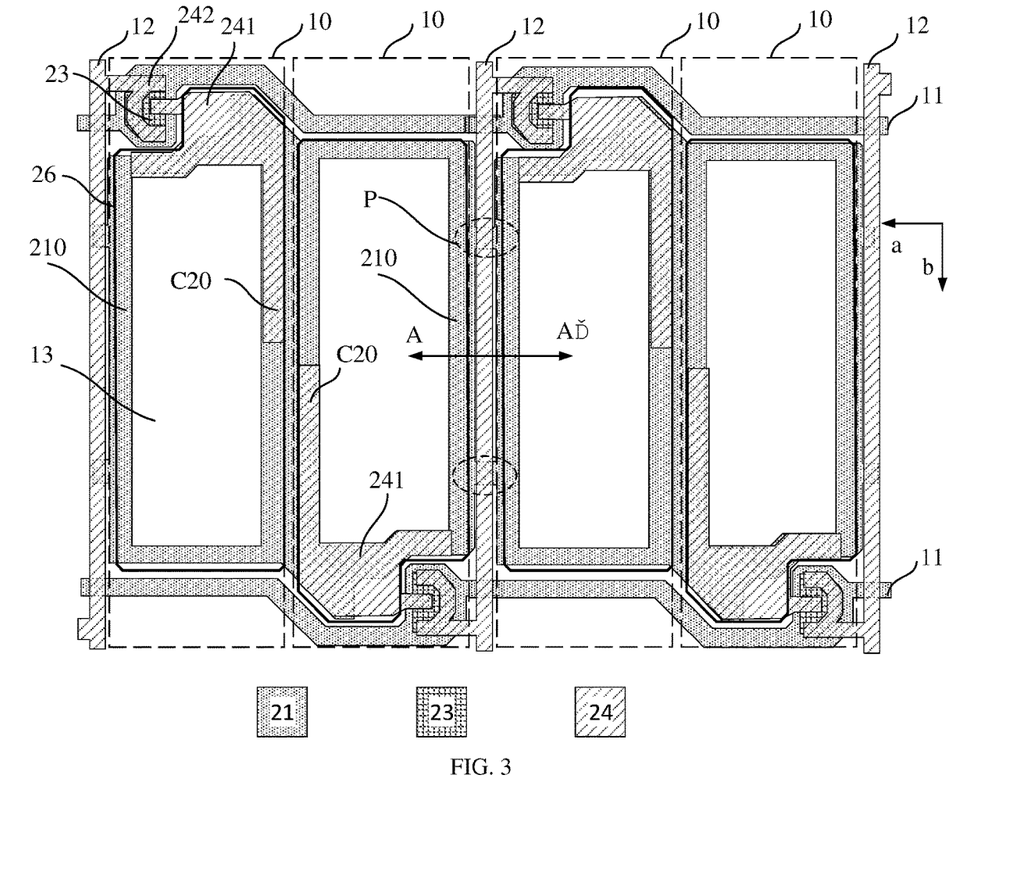
FIG. 3 is a schematic structural diagram of an array substrate according to an embodiment of the present disclosure.

FIG. 3 is a partial schematic structural diagram of an array substrate according to an embodiment of the present disclosure. FIG. 3 merely shows the gate electrode layer 21, the active layer 23, the source and drain electrode layer 24, and the pixel electrode 26, and the base substrate 20, the gate electrode insulating layer 22, and the planarization layer 25 are not shown. The source and drain electrode layer 24 includes the data line 12, a first electrode 241, and a second electrode 242. The first electrode 241 is one of the source electrode and the drain electrode, and the second electrode 242 is the other of the source electrode and the drain electrode. Exemplarily, the first electrode 241 is the source electrode, and the second electrode 242 is the drain electrode.

Figure 4:
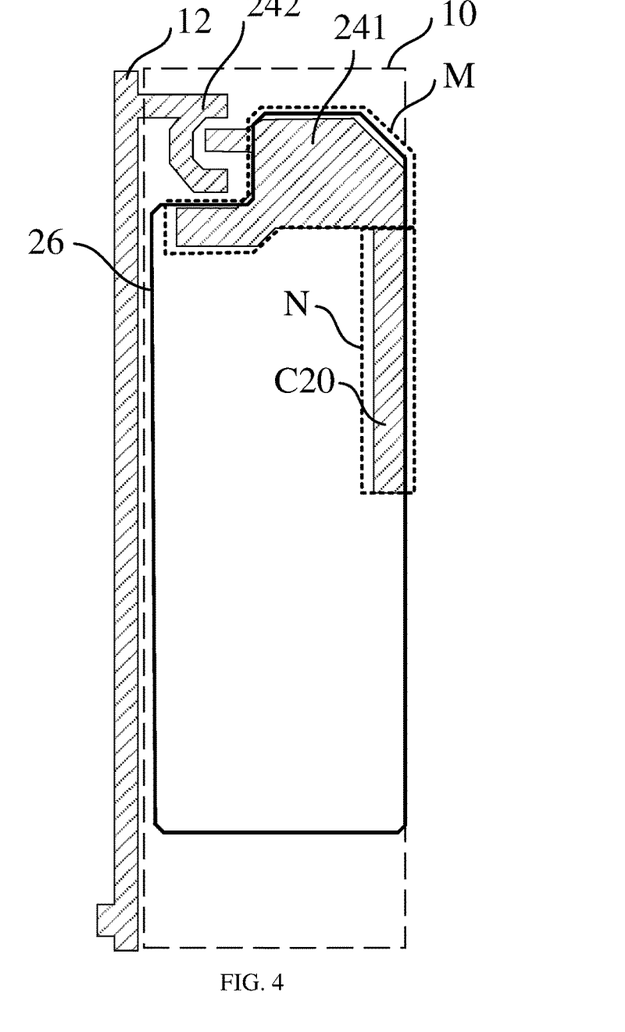
FIG. 4 is a schematic structural diagram of a source and drain electrode layer according to an embodiment of the present disclosure.

FIG. 4 further shows the structure of the source and drain electrode layer. As shown in FIG. 3 and FIG. 4, the second capacitor plate of the storage capacitor C1 is the first electrode 241 in the source and drain electrode layer 24, which is the part in a dashed box corresponding to the mark M in FIG. 4. The first capacitor plate of the extended storage capacitor C2 is the pixel electrode 26, and the second capacitor plate C20 of the extended storage capacitor C2 is disposed in the source and drain electrode layer 24 and is connected to the source electrode of the source and drain electrode layer 24, that is, the long strip part in the dashed box corresponding to the mark N in FIG. 4.

As the second capacitor plate C20 of the extended storage capacitor is disposed in the source and drain electrode layer 24, the second capacitor plate may be electrically connected to the source electrode.

In this example, the second capacitor plate C20 of the extended storage capacitor C2 connected to the source electrode of the source and drain electrode layer 24 is added to form the extended storage capacitor C2 with the pixel electrode 26, which is equivalent to that the area of the source electrode in the source and drain electrode layer is increased to expand the overlap with the pixel electrode, thereby increasing the storage capacitor.

In some embodiments of the present disclosure, the plurality of sub-pixels 10 are arranged in an array, and FIG. 3 merely shows four sub-pixels 10 in one row. The source and drain electrode layer 24 includes a plurality of data lines 12 extending along a column direction b.

As shown in FIG. 3, two sub-pixels 10 in the same row of sub-pixels 10 are disposed between two adjacent data lines 12. Each of the two sub-pixels 10 includes an opening region 13, and the second capacitor plates C20 of the extended storage capacitors C2 of the two sub-pixels 10 are disposed between the two opening regions 13 of the two sub-pixels 10.

The opening region 13 in FIG. 3 is defined by the light-blocking pattern (shield bar, SB) 210 in the gate electrode layer 21. As shown in FIG. 3, the light blocking pattern 210 is in a square shape, and a hollow region in the middle of the square shape corresponds to the opening region 13.

It can be seen from FIG. 3 that the light-blocking patterns 210 of the two sub-pixels 10 between the two data lines 12 are completely connected as an integrated structure; and the light-blocking patterns 210 of the two sub-pixels 10 disposed on both sides of the data line 12 are connected to each other by two connecting parts, which reduces an overlap area of the data line 12 and the light-blocking patterns 210. The connecting part is the part in the elliptical dashed box corresponding to the mark P in FIG. 3.

In other embodiments, the light-blocking pattern 210 may further be another pattern capable of defining the opening region 13, such as a U shape. In some embodiments of the present disclosure, the light-blocking pattern 210 may be shared as the plate for storing capacitor, that is, a common (COM) electrode; and, the light-blocking pattern plays a role of light blocking with a black matrix on a color filter substrate.

The second capacitor plate C20 of the extended storage capacitor C2 is disposed between the opening regions 13 of the two sub-pixels 10. As the pixel electrode 26 can cover an area between the two opening regions 13, the extended storage capacitor C2 is disposed in such a way to be overlapped with the pixel electrode 26. Furthermore, by disposing the extended storage capacitor C2 in such a way, the opening region 13 is not occupied and an opening ratio of the display panel is not affected.

As shown in FIG. 3 and FIG. 4, the second capacitor plate C20 of the extended storage capacitor C2 may be strip-shaped, lengths of the two strip-shaped second capacitor plates C20 disposed in the same row of sub-pixels 10 between two adjacent data lines 12 extend along the column direction b, both first ends of the strip-shaped second capacitor plates C20 are connected to the corresponding first electrodes 241, orthographic projections of the two strip-shaped second capacitor plates C20 along the row direction are not overlapped with each other, and the row direction is perpendicular to the column direction b, that is, the direction a in the drawings.

As the orthographic projections of the two strip-shaped second capacitor plates C20 along the row direction are not overlapped with each other, the minimum distance between the two strip-shaped second capacitor plates C20 is the distance between second ends of the two strip-shaped second capacitor plates C20. The distance between the second ends of the two strip-shaped second capacitor plates C20 is greater than a threshold. Exemplarily, the threshold may be the distance between the two strip-shaped second capacitor plates C20 along the row direction, which, is merely an example. The threshold may be defined based on actual conditions as long as an interference between the two strip-shaped second capacitor plates C20 is sufficiently small.

Due to the use of the strip-shaped second capacitor plates C20 and the arrangement of the second capacitor plates C20 in the above way, it can be ensured that a sufficient distance is defined between the second capacitor plates C20 in the two sub-pixels 10, and the short distance between the second capacitor plates C20 of the two extended storage capacitors C2 is prevented from affecting performances of the capacitors.

Exemplarily, an orthographic projection of the second capacitor plate C20 of the extended storage capacitor C2 on the base substrate is within an orthographic projection of the pixel electrode 26 on the base substrate. There is a distance between the pixel electrodes 26 of adjacent sub-pixels, and the second capacitor plate C20 is designed in this way, such that a width of the second capacitor plate C20 along the row direction is prevented from being too large, and the distance of the second capacitor plates C20 of the adjacent sub-pixels along the row direction is ensured to avoid mutual interference. In addition, the orthographic projection of the second capacitor plate C20 of the extended storage capacitor C2 on the base substrate and an orthographic projection of the opening region 13 on the base substrate are not overlapped with each other.

Exemplarily, the orthographic projections of two side edges of the second capacitor plate C20 of the extended storage capacitor C2 on the base substrate covers orthographic projections of the edge of the opening region 13 and the edge of the pixel electrode 26 on the base substrate, thereby ensuring that the area of the second capacitor plate C20 is as large as possible.

Figure 5:
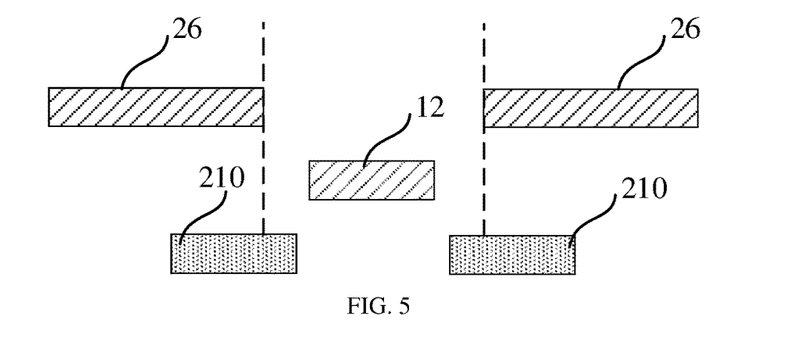
FIG. 5 is a cross-sectional view taken along data line A-A' in FIG. 3.

FIG. 5 shows a cross-sectional view taken along data line A-A' in FIG. 3. Referring to FIG. 5, on both sides of the data line 12, the side edge, proximal to the data line 12, of the pixel electrode 26 is not aligned with the side edge, proximal to the data line 12, of the light-blocking pattern 210. That is, the orthographic projection of the side edge, proximal to the data line 12, of the pixel electrode 26 on the base substrate 20 does not cover the orthographic projection of the side, proximal to the data line 12, of the light-blocking pattern 210 on the base substrate 20, and the side, proximal to the data line 12, of the light-blocking pattern 210 is closer to the data line 12 than the pixel electrode 26.

In an example of the embodiment of the present disclosure, the second capacitor plate of the storage capacitor C1 is the light-blocking pattern 210 in the gate electrode layer 21.

The first capacitor plate of the extended storage capacitor C2 is disposed in the same layer as the pixel electrode 26, and is connected to the pixel electrode 26. The second capacitor plate C20 of the extended storage capacitor C2 is the light-blocking pattern 210 in the gate electrode layer 21. The same layer may refer to that they are formed in one patterning process, or they are disposed in the same side of the same layer, or the surfaces close to the base substrate are in contact with the same layer, or the like.

In this example, the second capacitor plate C20 of the extended storage capacitor C2 connected to the pixel electrode 26 is added to form the extended storage capacitor C2 with the light-blocking pattern 210 in the gate electrode layer 21, which is equivalent to that the area of the pixel electrode 26 is increased to expand an overlap area with the light-blocking pattern 210, thereby increasing the storage capacitor.

As mentioned above, the array substrate according to the embodiments of the present disclosure is the array substrate with a dual-gate structure, that is, each of both sides of the data line 12 is provided with one column of sub-pixels 10.

Figure 6:
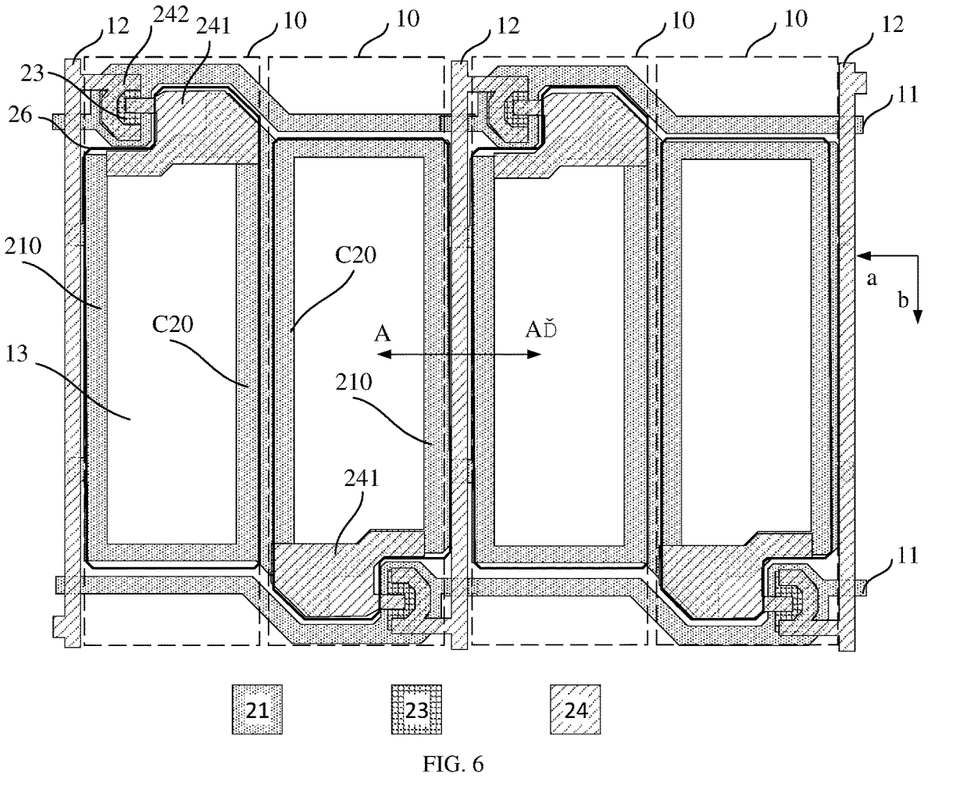
FIG. 6 is a schematic structural diagram of an array substrate according to an embodiment of the present disclosure.

FIG. 6 is a schematic structural diagram of an array substrate according to an embodiment of the present disclosure. FIG. 6 differs from FIG. 3 in that the second capacitor plate C20 in FIG. 3 is not disposed in the source and drain electrode layer; on two sides of the data line 12, one side edge, proximal to the data line 12, of the pixel electrode 26 is aligned with one side edge, proximal to the data line 12, of the light-blocking pattern 210. That is, the orthographic projection of the side edge, proximal to the data line 12, of the pixel electrode 26 on the base substrate 20 covers the orthographic projection of one side, proximal to the data line 12, of the light-blocking pattern 210 on the base substrate 20.

Figure 7:
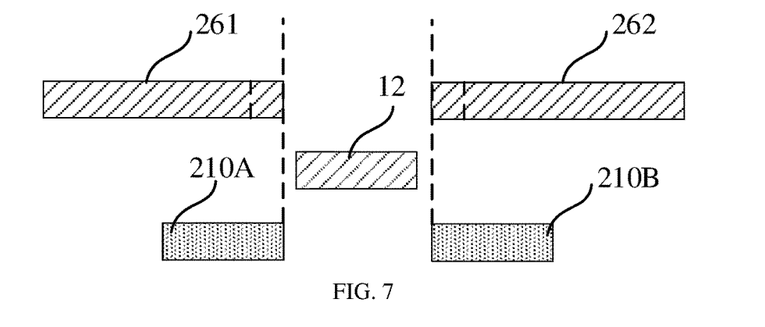
FIG. 7 is a cross-sectional view taken along data line A-A' in FIG. 6.

FIG. 7 shows a cross-sectional view taken along data line A-A' in FIG. 6. Referring to FIG. 7, in the two columns of sub-pixels on both sides of the same data line 12, the gate electrode layer includes a first light-blocking pattern 210A and a second light-blocking pattern 210B which are respectively disposed in the two sub-pixels in the same row, a first pixel electrode 261 and a second pixel electrode 262 are respectively disposed in the two sub-pixels in the same row, the first light-blocking pattern 210A and the first pixel electrode 261 are disposed in the same sub-pixel 10, and the second light-blocking pattern 210B and the second pixel electrode 262 are disposed in the same sub-pixel 10.

The orthographic projection of the side edge, proximal to the data line 12, of the first light-blocking pattern 210A on the base substrate covers the orthographic projection of the side edge, proximal to the data line 12, of the first pixel electrode 261 on the base substrate, and the orthographic projection of the side edge, proximal to the data line 12, of the second light-blocking pattern 210B on the base substrate covers the orthographic projection of the side edge, proximal to the data line 12, of the second pixel electrode 262 on the base substrate.

The extra parts of the first pixel electrode 261 and the second pixel electrode 262 in FIG. 7 compared to those in FIG. 5 are the first capacitor plates of the aforementioned extended storage capacitors C2.

Figure 8:
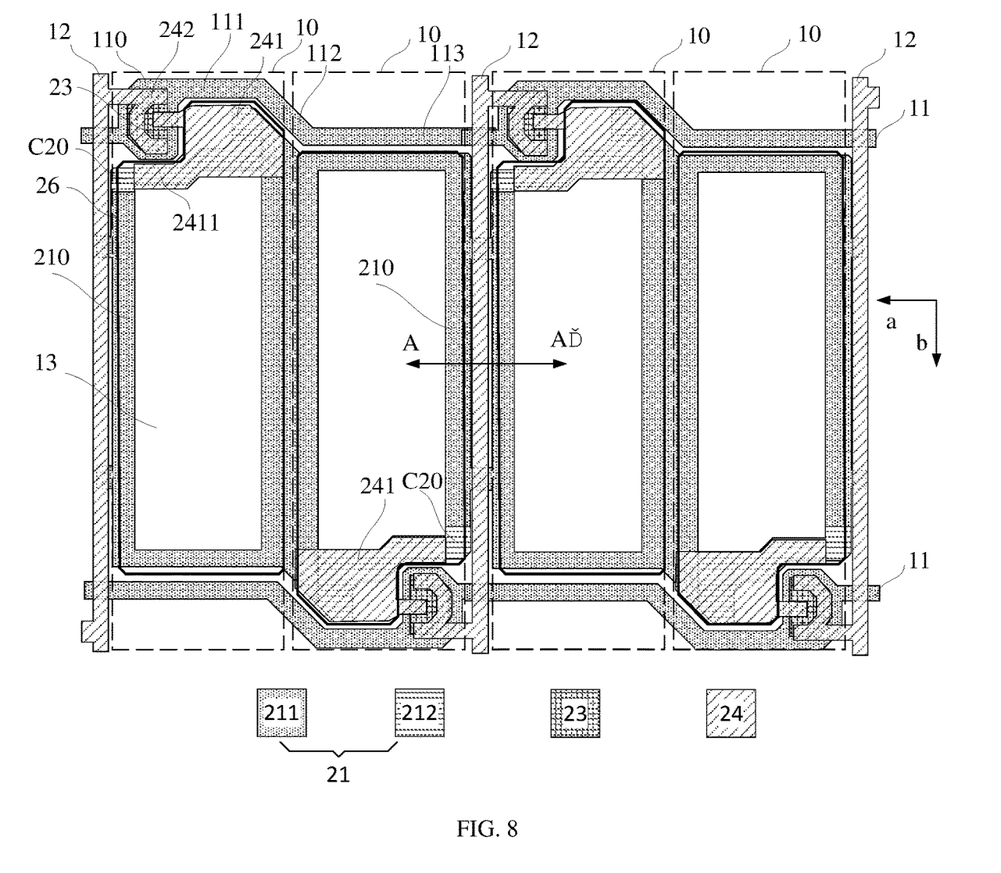
FIG. 8 is a schematic structural diagram of an array substrate according to an embodiment of the present disclosure.

FIG. 8 is a schematic structural diagram of an array substrate according to an embodiment of the present disclosure. FIG. 8 differs from FIG. 3 in that the second capacitor plate C20 in FIG. 3 is not disposed on the source and drain electrode layer; the gate electrode layer 21 includes a gate electrode metal sub-layer 211 and a conductive thin film sub-layer 212. Exemplarily, the conductive thin film sub-layer 212 is disposed between the base substrate and the gate electrode metal sub-layer 211. The gate electrode layer 21 includes a U-shaped light-blocking pattern 210.

The second capacitor plate of the storage capacitor C1 is the light-blocking pattern 210; the first capacitor plate of the extended storage capacitor C2 is the pixel electrode 26, the second capacitor plate C20 of the extended storage capacitor C2 is disposed in the conductive thin film sub-layer 212, the orthographic projections of the second capacitor plate C20 of the extended storage capacitor C2 and the U-shaped opening of the light-blocking pattern 210 on the base substrate are at least partially overlapped with each other, and the second capacitor plate C20 of the extended storage capacitor C2 is electrically connected to the light-blocking pattern 210.

In this example, the extended storage capacitor is formed by overlapping the newly-added conductive thin film sub-layer 212 and the pixel electrode, thereby increasing the storage capacitor. The advantage of forming the capacitor from the conductive thin film sub-layer 212 and the pixel electrode is that a distance between the conductive thin film sub-layer 212 and a gate line 11 in the gate electrode layer is greater than a distance between the light-blocking pattern 210 and the gate line 11, and a parasitic capacitance of the conductive thin film sub-layer 212 and the gate line 11 is less than a parasitic capacitance between the light-blocking pattern 210 and the gate line 11. Therefore, the capacitor formed from the conductive thin film sub-layer 212 and the pixel electrode 26 is more stable.

The conductive thin film sub-layer 212 may be an indium tin oxide layer.

In some embodiments, the extended storage capacitor may be implemented according to any of the foregoing embodiments, or according to a combination of two or more embodiments. That is, two or more extended storage capacitors are designed simultaneously and are connected to the storage capacitor in parallel.

Exemplarily, the extended storage capacitors include a first extended storage capacitor and a second extended storage capacitor. The first capacitor plate of the first extended storage capacitor is the pixel electrode 26, and the second capacitor plate C20 of the first extended storage capacitor is disposed in the source and drain electrode layer 24, and is connected to the first electrode 241 of the source and drain electrodes layer 24 (i.e., the solution shown in FIG. 3); the first capacitor plate of the second extended storage capacitor is disposed in the same layer as the pixel electrode 26, and is connected to the pixel electrode 26, and the second capacitor plate of the second extended storage capacitor is the light-blocking pattern 210 in the gate electrode layer 21 (i.e., the solution shown in FIG. 6).

Exemplarily, the extended storage capacitors include the first extended storage capacitor and a third extended storage capacitor. The first capacitor plate of the first extended storage capacitor is the pixel electrode 26, and the second capacitor plate of the first extended storage capacitor is disposed in the source and drain electrode layer 24, and is connected to the first electrode 241 of the source and drain electrode layer 24 (i.e., the solution shown in FIG. 3); the first capacitor plate of the third extended storage capacitor is the pixel electrode 26, the second capacitor plate of the third extended storage capacitor is disposed in the conductive thin film sub-layer 212, the orthographic projections of the second capacitor plate of the third extended storage capacitor and the U-shaped opening of the light-blocking pattern 210 on the base substrate 20 are at least partially overlapped with each other, and the second capacitor plate of the third extended storage capacitor is electrically connected to the light-blocking pattern 210 (i.e., the solution shown in FIG. 8).

Exemplarily, the extended storage capacitors include the second extended storage capacitor and the third extended storage capacitor. The first capacitor plate of the second extended storage capacitor is disposed in the same layer as the pixel electrode 26, and is connected to the pixel electrode 26. The second capacitor plate of the second extended storage capacitor is the light-blocking pattern 210 in the gate electrode layer 21 (i.e., the solution shown in FIG. 6); the first capacitor plate of the third extended storage capacitor is the pixel electrode 26, the second capacitor plate of the third extended storage capacitor is disposed in the conductive thin film sub-layer 212, the orthographic projections of the second capacitor plate of the third extended storage capacitor and the U-shaped opening of the light-blocking pattern 210 on the base substrate 20 are at least partially overlapped with each other, and the second capacitor plate of the third extended storage capacitor is electrically connected to the light-blocking pattern 210 (i.e., the solution shown in FIG. 8).

Exemplarily, the extended storage capacitors include the first extended storage capacitor, the second extended storage capacitor, and the third extended storage capacitor. The first capacitor plate of the first extended storage capacitor is the pixel electrode 26, and the second capacitor plate C20 of the first extended storage capacitor is disposed in the source and drain electrode layer 24, and is connected to the first electrode 241 of the source and drain electrode layer 24 (i.e., the solution shown in FIG. 3); the first capacitor plate of the second extended storage capacitor is disposed in the same layer as the pixel electrode 26, and is connected to the pixel electrode 26, and the second capacitor plate of the second extended storage capacitor is the light-blocking pattern 210 in the gate electrode layer 21 (i.e., the solution shown in FIG. 6); the first capacitor plate of the third extended storage capacitor is the pixel electrode 26, the second capacitor plate of the third extended storage capacitor is disposed in the conductive thin film sub-layer 212, the orthographic projections of the second capacitor plate of the third extended storage capacitor and the U-shaped opening of the light-blocking pattern 210 on the base substrate 20 are at least partially overlapped with each other, and the second capacitor plate of the third extended storage capacitor is electrically connected to the light-blocking pattern 210 (i.e., the solution shown in FIG. 8).

As shown in FIG. 8, in some embodiments of the present disclosure, the gate electrode layer 21 comprises a plurality of gate lines 11, each of the gate line 11 comprises a gate electrode 110 of a transistor, a first segment 111, a second segment 112 and a third segment 113 which are sequentially connected in the row direction. The extending direction of the first segment 111 is the same as the extending direction of the third segment 113, and the extending direction of the second segment 112 intersects with the extending direction of the first segment 111. As such, a corner area is formed by the intersecting first segment 111 and second segment 112, and the second capacitor plate of the storage capacitor C1 (i.e., the first electrode 241) is at least partially disposed in the corner area which is between the first segment 111 and the second segment 112. As for the transistor, the first electrode 241 and the second electrode 242 are one of the source electrode of the transistor and the drain electrode of the transistor, respectively. The first electrode 241 of the transistor is connected to the data line 12, and the second electrode 242 is connected to the pixel electrode 26. The first electrode 241 is also used as the second capacitor plate of the storage capacitor C1, and the first electrode 241 comprises an protruding portion 2411 which extends towards the data line 12 connected to the second electrode 242 of the transistor as shown in FIG. 8. In each of the sub-pixels 10, an orthographic projection of the protruding portion 2411 on the base substrate 20 is on a side, close to the opening region 13, of an orthographic projection of the gate electrode 110 on the base substrate 20. For example, as shown in FIG. 8, the orthographic projection of the protruding portion 2411 is located right below (or above in other sub-pixels 10) the orthographic projection of the gate electrode 110.

An embodiment of the present disclosure provides a display device. The display device includes the array substrate as defined in any of the preceding embodiments.

In the specific example, the display device according to the embodiment of the present disclosure may be any product or component with a display function, such as a mobile phone, a tablet computer, a television, a monitor, a notebook computer, a digital photo frame, and a navigator.

In the solution, the capacitance of the storage capacitor is increased by adding one extended storage capacitor connected to the storage capacitor in parallel, thereby preventing a coupling capacitance between signal lines in the display substrate from affecting the display of the display panel in the case that the capacitance of the storage capacitor is not large enough, and improving display uniformity.

An embodiment of the present disclosure further provides a method for manufacturing an array substrate. The method is applicable to manufacturing the array substrate as defined in any one of the foregoing embodiments. The method includes: manufacturing a storage capacitor and an extended storage capacitor in a sub-pixel, and connecting the extended storage capacitor and the storage capacitor in parallel.

In the solution, the capacitance of the storage capacitor is increased by adding one extended storage capacitor connected to the storage capacitor in parallel, thereby preventing a coupling capacitance between signal lines in the display substrate from affecting the display of the display panel in the case that the capacitance of the storage capacitor is not large enough, and improving display uniformity.

Figure 9:
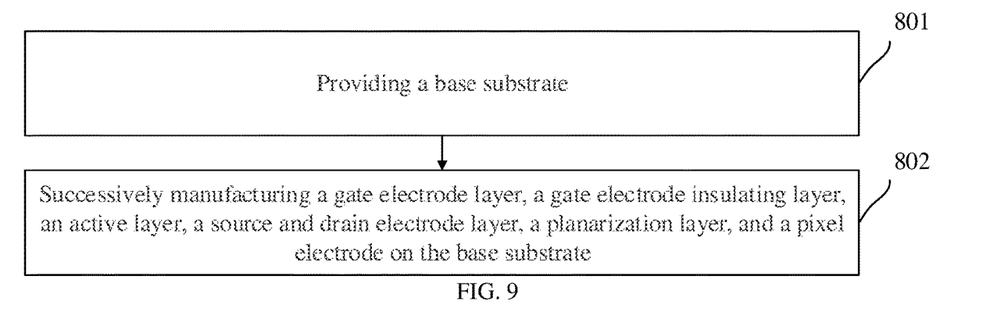
FIG. 9 is a flowchart of a method for manufacturing an array substrate according to an embodiment of the present disclosure.

FIG. 9 is a flowchart of a method for manufacturing an array substrate according to an embodiment of the present disclosure. Referring to FIG. 9, the method includes the following processes.

In S801, a base substrate is provided.

The base substrate may be a glass substrate.

In S802, a gate electrode layer, a gate electrode insulating layer, an active layer, a source and drain electrode layer, a planarization layer, and a pixel electrode are successively manufactured on the base substrate.

A first capacitor plate of the storage capacitor is disposed in a layer where the pixel electrode is disposed, and a second capacitor plate of the storage capacitor is disposed in at least one of the gate electrode layer or the source and drain electrode layer. A first capacitor plate of the extended storage capacitor is disposed in the layer where the pixel electrode is disposed, and a second capacitor plate of the extended storage capacitor is disposed in at least one of the gate electrode layer or the source and drain electrode layer.

The gate electrode layer and the source and drain electrode layer may be a metal layer or an indium tin oxide layer. The gate electrode insulating layer may be an insulating layer made of one of silicon oxide, silicon nitride, and silicon oxynitride, or a laminated layer made of at least two layers therein. The active layer may be a polysilicon layer or an amorphous silicon layer. The planarization layer may be a resin layer, and the planarization layer may further be a planarization layer made of one of silicon oxide, silicon nitride, and silicon oxynitride, or a laminated layer made of at least two layers therein. The pixel electrode may be an indium tin oxide electrode.

In an example of the embodiment of the present disclosure, the first capacitor plate of the storage capacitor is the pixel electrode, and the second capacitor plate of the storage capacitor is a first electrode in the source and drain electrode layer.

The first capacitor plate of the extended storage capacitor is the pixel electrode, and the second capacitor plate of the extended storage capacitor is disposed in the source and drain electrode layer, and is connected to the first electrode of the source and drain electrode layer.

Exemplarily, S802 may include: forming the gate electrode layer on the base substrate; forming the gate electrode insulating layer and the active layer on the gate electrode layer; forming the source and drain electrode layer on the active layer, wherein the source and drain electrode layer includes a source electrode, a drain electrode, a data line, and the second capacitor plate of the extended storage capacitor; forming the planarization layer and a via hole configured to connect the source electrode and the pixel electrode on the source and drain electrode layer; and forming the pixel electrode on the planarization layer.

In this example, the array substrate may be manufactured by a 5Mask process.

In another example of the embodiment of the present disclosure, the first capacitor plate of the storage capacitor is the pixel electrode, and the second capacitor plate of the storage capacitor is a light-blocking pattern in the gate electrode layer.

The first capacitor plate of the extended storage capacitor is disposed in the same layer as the pixel electrode, and is connected to the pixel electrode, and the second capacitor plate is the light-blocking pattern in the gate electrode layer.

Exemplarily, S802 may include: forming the gate electrode layer on the base substrate; forming the gate electrode insulating layer and the active layer on the gate electrode layer; forming the source and drain electrode layer on the active layer; forming the planarization layer and a via hole configured to connect the source electrode and the pixel electrode on the source and drain electrode layer; and forming the pixel electrode and the first capacitor plate of the extended storage capacitor on the planarization layer.

In this example, the array substrate may be manufactured by a 5Mask process.

In yet another example of the embodiment of the present disclosure, the gate electrode layer includes a gate electrode metal sub-layer and a conductive thin film sub-layer, and the gate electrode layer includes a U-shaped light-blocking pattern.

The first capacitor plate of the storage capacitor is the pixel electrode, and the second capacitor plate of the storage capacitor is the light-blocking pattern.

The first capacitor plate of the extended storage capacitor is the pixel electrode, the second capacitor plate of the extended storage capacitor is disposed in the conductive thin film sub-layer, orthographic projections of the second capacitor plate of the extended storage capacitor and a U-shaped opening of the light-blocking pattern on the base substrate are at least partially overlapped with each other, and the second capacitor plate of the extended storage capacitor is electrically connected to the light-blocking pattern.

Detailed description is given in detail hereinafter with reference to the accompanying drawings. Successively manufacturing the conductive thin film sub-layer and the gate electrode metal sub-layer on the base substrate may include the following processes.

Figure 10:
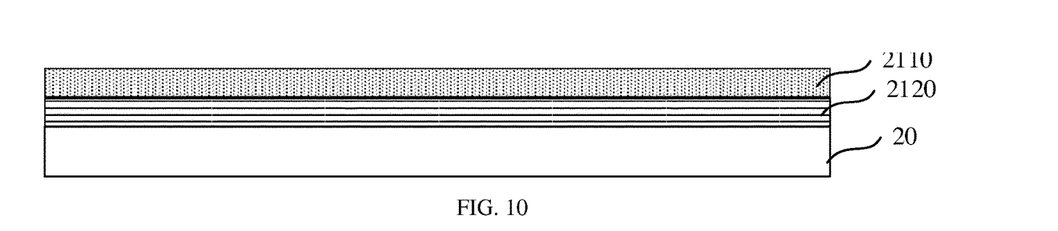
FIG. 10 is a schematic diagram showing a process of manufacturing an array substrate according to an embodiment of the present disclosure.

In S1, a conductive thin film and a gate electrode metal are successively deposited on the base substrate.

FIG. 10 is a schematic diagram showing a process of manufacturing an array substrate according to an embodiment of the present disclosure. Referring to FIG. 10, a conductive thin film 2120 and a gate electrode metal 2110 are successively deposited on the base substrate 20.

Figure 11:
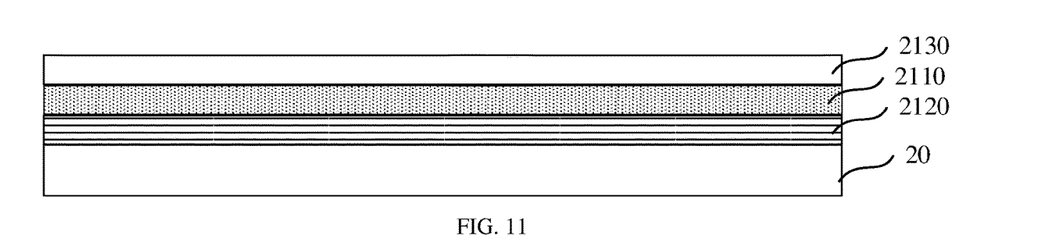
FIG. 11 is a schematic diagram showing a process of manufacturing an array substrate according to an embodiment of the present disclosure.

In S2, a layer of photoresist is coated on the gate electrode metal.

FIG. 11 is a schematic diagram showing a process of manufacturing an array substrate according to an embodiment of the present disclosure. Referring to FIG. 11, a layer of photoresist 2130 is coated on the gate electrode metal 2110. The photoresist may be a positive photoresist, or a negative photoresist.

Figure 12:
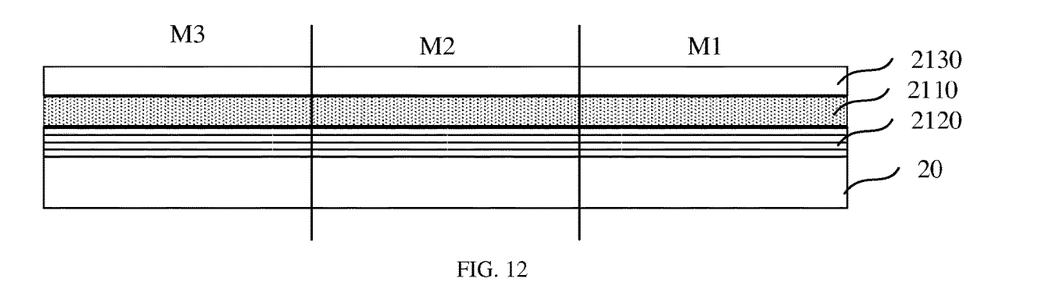
FIG. 12 is a schematic diagram showing a process of manufacturing an array substrate according to an embodiment of the present disclosure.

In S3, the photoresist is exposed by using a halftone mask process, wherein a region corresponding to the light-blocking pattern is an unexposed region. The U-shaped opening of the light-blocking pattern is a half-exposed region, and the opening region and a region between the gate line and the light-blocking pattern are fully-exposed regions.

FIG. 12 is a schematic diagram showing a process of manufacturing an array substrate according to an embodiment of the present disclosure. Referring to FIG. 12, the photoresist 2130 is exposed by using a halftone mask (HTM) process. The exposed display substrate is divided into 3 regions, the unexposed region M1, the half-exposed region M2, and the fully-exposed region M3.

Figure 13:
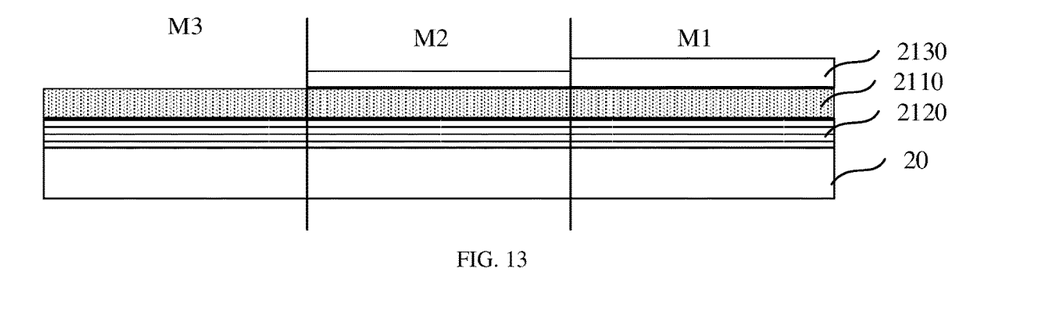
FIG. 13 is a schematic diagram showing a process of manufacturing an array substrate according to an embodiment of the present disclosure.

In S4, the photoresist, the gate electrode metal, and the conductive thin film in the fully-exposed region are successively removed.

FIG. 13 is a schematic diagram showing a process of manufacturing an array substrate according to an embodiment of the present disclosure. Referring to FIG. 13, the photoresist 2130 in the fully-exposed region M3 is firstly removed by a photoresist removal process. In this case, part of the thickness of photoresist in the half-exposed region M2 is removed.

Figure 14:
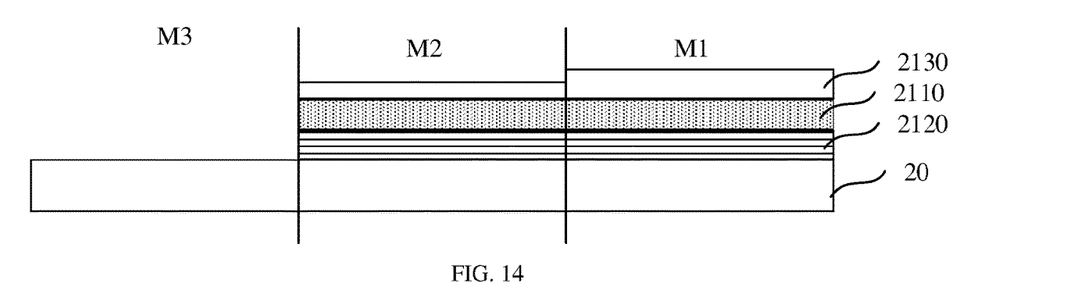
FIG. 14 is a schematic diagram showing a process of manufacturing an array substrate according to an embodiment of the present disclosure.

FIG. 14 is a schematic diagram showing a process of manufacturing an array substrate according to an embodiment of the present disclosure. Referring to FIG. 14, the gate electrode metal 2110 and the conductive thin film 2120 in the fully-exposed region M3 are successively removed by an etching process. As the gate electrode metal 2110 and the conductive thin film 2120 are made of different materials, the removal process needs to be carried out in two steps. Exemplarily, the aforementioned etching process may be a wet etching process. A gate electrode metal etching solution is used to remove the gate electrode metal 2110, and a conductive thin film etching solution is used to remove the conductive thin film 2120.

Figure 15:
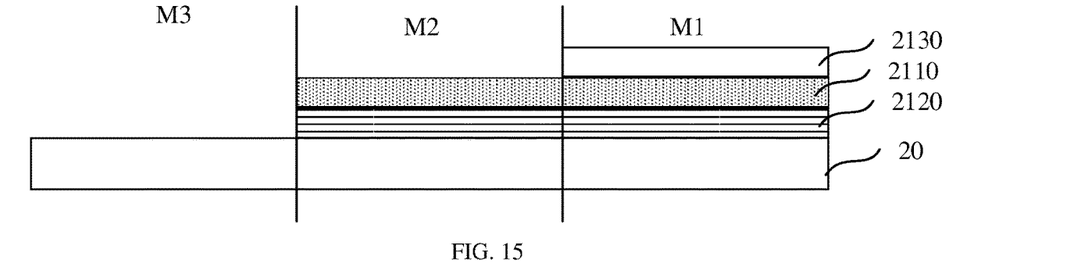
FIG. 15 is a schematic diagram showing a process of manufacturing an array substrate according to an embodiment of the present disclosure.

In S5, the photoresist and the gate electrode metal in the half-exposed region are successively removed.

FIG. 15 is a schematic diagram showing a process of manufacturing an array substrate according to an embodiment of the present disclosure. Referring to FIG. 15, firstly, the photoresist 2130 in the half-exposed region M2 is removed by the photoresist removal process.

Figure 16:
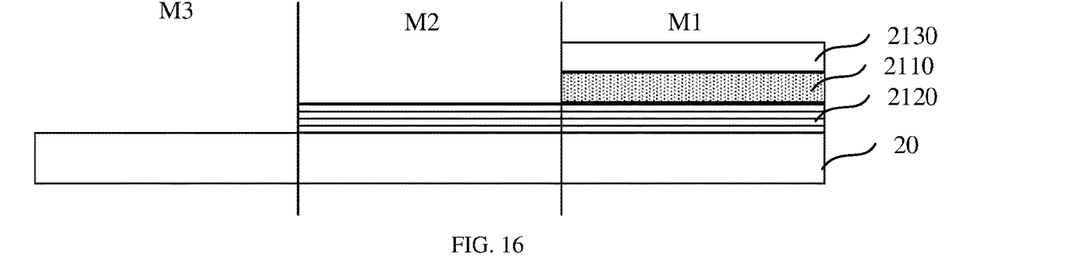
FIG. 16 is a schematic diagram showing a process of manufacturing an array substrate according to an embodiment of the present disclosure.

FIG. 16 is a schematic diagram showing a process of manufacturing an array substrate according to an embodiment of the present disclosure. Referring to FIG. 16, the etching process is implemented to remove the gate electrode metal 2110 in the half-exposed region M2. Exemplarily, the aforementioned etching process may be a wet etching process, and the gate electrode metal etching solution is used to remove the gate electrode metal 2110.

Figure 17:
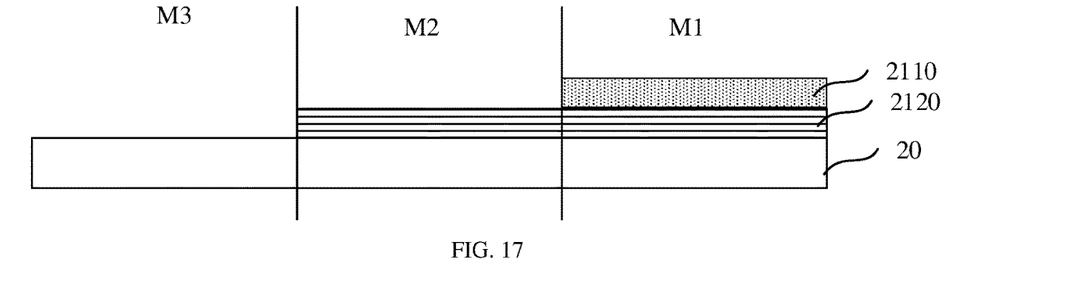
FIG. 17 is a schematic diagram showing a process of manufacturing an array substrate according to an embodiment of the present disclosure.

In S6, the conductive thin film sub-layer and the gate electrode metal sub-layer is acquired by removing the photoresist in the unexposed region.

FIG. 17 is a schematic diagram showing a process of manufacturing an array substrate according to an embodiment of the present disclosure. Referring to FIG. 17, the photoresist removal process is implemented to remove the photoresist 2130 in the unexposed region M1.

It can be seen that although the conductive thin film sub-layer is added, the conductive thin film sub-layer and the gate electrode metal sub-layer are manufactured by using the same mask. Therefore, the array substrate can still be manufactured by the 5Mask process, and the effect of improving vertical stripes of the liquid crystal display can be achieved without adding a new mask, which reducing the production cost of improving the problem of vertical stripes and the process time, such that the design of the solution can quickly achieve productization and mass production.

Described above are merely exemplary embodiments of the present disclosure, and are not intended to limit the present disclosure. It should be noted that any modification, equivalent replacement, improvement, and the like made within the spirit and principle of the embodiments of the present disclosure should be included in the protection scope of the present disclosure.

The invention claimed is:

1. An array substrate, comprising a plurality of sub-pixels, wherein
a storage capacitor and an extended storage capacitor are disposed in each of the plurality of sub-pixels;
the array substrate comprises a gate electrode layer, a source and drain electrode layer, and a pixel electrode;
a first capacitor plate of the storage capacitor is disposed in a layer where the pixel electrode is disposed, and a second capacitor plate of the storage capacitor is disposed in at least one layer of the gate electrode layer and the source and drain electrode layer;
the second capacitor plate of the storage capacitor is a first electrode in the source and drain electrode layer; a first capacitor plate of the extended storage capacitor is disposed in the same layer as the pixel electrode or disposed in the gate electrode layer, a second capacitor plate of the extended storage capacitor is disposed in the source and drain electrode layer, and is connected to the first electrode of the source and drain electrode layer; the plurality of sub-pixels are arranged in an array, and the source and drain electrode layer comprises a plurality of data lines extending along a column direction; and
two sub-pixels in the same row of sub-pixels are disposed between two adjacent data lines, each of the two sub-pixels comprises an opening region, and the second capacitor plates of the extended storage capacitors of the two sub-pixels are disposed between the two opening regions of the two sub-pixels.

2. The array substrate according to claim 1, wherein the gate electrode layer comprises a first light-blocking pattern and a second light-blocking pattern which are respectively disposed in the two sub-pixels disposed in the same row, the first light-blocking pattern and the second light-blocking pattern being respectively disposed on two sides of the same data line.

3. The array substrate according to claim 1, wherein the gate electrode layer comprises a light-blocking pattern in each of the sub-pixels, and light-blocking patterns disposed on two sides of the same data line are connected to each other by a connecting part in the gate electrode layer.

4. The array substrate according to claim 3, wherein light-blocking patterns in the two sub-pixels in the same row of sub-pixels and between two adjacent data lines are connected as an integrated structure, the array substrate further comprises a base substrate, an orthographic projection of a light-blocking pattern disposed between opening regions of the two sub-pixels in the same row of sub-pixels on the base substrate overlaps with an orthographic projection of the second capacitor plate of the extended storage capacitor on the base substrate.

5. The array substrate according to claim 1, wherein the first electrode is connected to the pixel electrode.

6. The array substrate according to claim 1, wherein the second capacitor plate of the extended storage capacitor is strip-shaped, wherein both lengths of two strip-shaped second capacitor plates disposed in the same row of sub-pixels between the two adjacent data lines extend along the column direction, first ends of the two strip-shaped second capacitor plates are connected to corresponding first electrodes, and orthographic projections of the two strip-shaped second capacitor plates along a row direction are not overlapped with each other, the row direction being perpendicular to the column direction.

7. The array substrate according to claim 1, wherein the first capacitor plate of the storage capacitor is the pixel electrode, and the second capacitor plate of the storage capacitor is a light-blocking pattern in the gate electrode layer; and
the second capacitor plate of the extended storage capacitor is connected to the pixel electrode, and the first capacitor plate of the extended storage capacitor is the light-blocking pattern in the gate electrode layer.

8. The array substrate according to claim 1, wherein the plurality of sub-pixels are arranged in an array; wherein
both sides of each of the plurality of data lines are each provided with one column of sub-pixels;
in the two columns of sub-pixels disposed on the both sides of the same data line, the gate electrode layer comprises a first light-blocking pattern and a second light-blocking pattern which are respectively disposed in the two sub-pixels in the same row, a first pixel electrode and a second pixel electrode are respectively disposed in the two sub-pixels in the same row, wherein the first light-blocking pattern and the first pixel electrode are disposed in the same sub-pixel, and the second light-blocking pattern and the second pixel electrode are disposed in the same sub-pixel; and
an orthographic projection of side edge, proximal to the data line, of the first light-blocking pattern on a base substrate covers an orthographic projection of side edge, proximal to the data line, of the first pixel electrode on the base substrate, and an orthographic projection of side edge, proximal to the data line, of the second light-blocking pattern covers an orthographic projection of side edge, proximal to the data line, of the second pixel electrode on the base substrate.

9. The array substrate according to claim 1, wherein the gate electrode layer comprises a gate electrode metal sub-layer and a conductive thin film sub-layer, and the gate electrode layer comprises a U-shaped light-blocking pattern;
the first capacitor plate of the extended storage capacitor is disposed in the conductive thin film sub-layer, orthographic projections of the second capacitor plate of the extended storage capacitor and a U-shaped opening of the light-blocking pattern on a base substrate are at least partially overlapped with each other, and the first capacitor plate of the extended storage capacitor is electrically connected to the light-blocking pattern.

10. The array substrate according to claim 9, wherein the first capacitor plate of the storage capacitor is the pixel electrode, and the second capacitor plate of the storage capacitor is the light-blocking pattern; and
the second capacitor plate of the extended storage capacitor is connected to the pixel electrode.

11. The array substrate according to claim 10, wherein the light-blocking pattern is formed by the gate electrode metal sub-layer and the conductive thin film sub-layer.

12. The array substrate according to claim 1, wherein a capacitance of the storage capacitor ranges from 0.12 pF to 0.15 pF, and a capacitance of the extended storage capacitor and the storage capacitor connected in parallel ranges from 0.18 pF to 0.22 pF.

13. The array substrate according to claim 1, wherein the gate electrode layer comprises a plurality of gate lines, each of the gate line comprises a gate electrode of a transistor, a first segment, a second segment and a third segment sequentially connected, an extending direction of the first segment is the same as an extending direction of the third segment, and an extending direction of the second segment intersects with the extending direction of the first segment.

14. The array substrate according to claim 13, wherein the second capacitor plate of the storage capacitor is at least partially disposed in a corner area which is between the first segment and the second segment.

15. The array substrate according to claim 13, wherein a source electrode and a drain electrode of the transistor are respectively connected to one of the data lines and the pixel electrode, one of the source electrode and the drain electrode is also used as the second capacitor plate of the storage capacitor, and comprises an protruding portion which extends towards the one of the data lines.

16. The array substrate according to claim 15, wherein the array substrate further comprises a base substrate; and in each of the sub-pixels, an orthographic projection of the protruding portion on the base substrate is on a side, close to an opening region, of an orthographic projection of the gate electrode on the base substrate.

17. A display device, comprising the array substrate according to claim 1.

18. A method for manufacturing an array substrate, the array substrate comprising a plurality of sub-pixels, the method comprising:
successively manufacturing a gate electrode layer, a source and drain electrode layer, and a pixel electrode, and forming a storage capacitor and an extended storage capacitor in the sub-pixel;
wherein a first capacitor plate of the storage capacitor is disposed in a layer where the pixel electrode is disposed, and a second capacitor plate of the storage capacitor is disposed in at least one of the gate electrode layer and the source and drain electrode layer;
the second capacitor plate of the storage capacitor is a first electrode in the source and drain electrode layer; a first capacitor plate of the extended storage capacitor is disposed in the same layer as the pixel electrode or disposed in the gate electrode layer, a second capacitor plate of extended storage capacitor is disposed in the source and drain electrode layer, and is connected to the first electrode of the source and drain electrode layer; the plurality of sub-pixels are arranged in an array, and the source and drain electrode layer comprises a plurality of data lines extending along a column direction; and
two sub-pixels in the same row of sub-pixels are disposed between two adjacent data lines, each of the two sub-pixels comprises an opening region, and the second capacitor plates of the extended storage capacitors of the two sub-pixels are disposed between the two opening regions of the two sub-pixels.

19. The method according to claim 18, wherein successively manufacturing the gate electrode layer, the source and drain electrode layer, and the pixel electrode comprises:
successively manufacturing a conductive thin film sub-layer, a gate electrode metal sub-layer, a gate electrode insulating layer, an active layer, the source and drain electrode layer, a planarization layer, and the pixel electrode on a base substrate, wherein the gate electrode layer comprises the gate electrode metal sub-layer and the conductive thin film sub-layer, and the gate electrode layer comprises a U-shaped light-blocking pattern;

the first capacitor plate of the storage capacitor is the pixel electrode, and the second capacitor plate of the storage capacitor is the light-blocking pattern; and the second capacitor plate of the extended storage capacitor is connected to the pixel electrode, the first capacitor plate of the extended storage capacitor is disposed in the conductive thin film sub-layer, orthographic projections of the first capacitor plate of the extended storage capacitor and a U-shaped opening of the light-blocking pattern on the base substrate are at least partially overlapped with each other, and the first capacitor plate of the extended storage capacitor is electrically connected to the light-blocking pattern; and wherein successively manufacturing the conductive thin film sub-layer and the gate electrode metal sub-layer on the base substrate comprises:

successively depositing a conductive thin film and a gate electrode metal on the base substrate;

coating a layer of a photoresist on the gate electrode metal;

exposing the photoresist by a halftone mask process, wherein a region corresponding to the light-blocking pattern is an unexposed region, and the U-shaped opening of the light-blocking pattern is a half-exposed region;

successively removing the photoresist, the gate electrode metal, and the conductive thin film in a fully-exposed region;

successively removing the photoresist and the gate electrode metal in the half-exposed region; and acquiring the conductive thin film sub-layer and the gate electrode metal sub-layer by removing the photoresist in the unexposed region.

20. The method according to claim 18, wherein the gate electrode layer comprises a first light-blocking pattern and a second light-blocking pattern which are respectively disposed in the two sub-pixels disposed in the same row, the first light-blocking pattern and the second light-blocking pattern being respectively disposed on two sides of the same data line.

* * * * *